Sept. 24, 1963  B. J. EDWILL  3,104,477
LEVEL
Filed Aug. 28, 1961  3 Sheets-Sheet 1

INVENTOR.
BETTY J. EDWILL
BY M. A. Hobbs
ATTORNEY

Sept. 24, 1963  B. J. EDWILL  3,104,477
LEVEL

Filed Aug. 28, 1961  3 Sheets-Sheet 2

INVENTOR.
BETTY J. EDWILL
BY *M. A. Hobbs*
ATTORNEY

Sept. 24, 1963     B. J. EDWILL     3,104,477
LEVEL

Filed Aug. 28, 1961     3 Sheets-Sheet 3

*INVENTOR.*
BETTY J. EDWILL
BY *M. A. Hobbs*
ATTORNEY 3,104,477
LEVEL
Betty J. Edwill, 136 Ontario St., Niles, Mich.
Filed Aug. 28, 1961, Ser. No. 134,473
7 Claims. (Cl. 33—208)

The present invention relates to a level and more particularly to a variably extensible level.

In building construction, remodeling and repairing, a level is used for a variety of different operations, often requiring a number of different sized levels in order to perform the work carefully and accurately. To do so requires the workman to have on hand at least several different lengths and sizes of levels. This practice, however, is impractical, expensive and space consuming, and will normally not be followed by the individual workman or do-it-yourself home owner or repairman. One small or medium sized level will usually be employed to perform all the operations, large and small, and will often result in poor workmanship or faulty construction. It is therefore one of the principal objects of the invention to provide an extensible or expandable level which can be placed in several fixed, predetermined expanded positions where it will remain while the level is being used and which includes an easily releasable means for retaining the level in its fully contracted position or any one of several expanded positions.

Another object of the invention is to provide a level which can be used in its fully contracted position or in any one of several predetermined extended positions and which can be readily disassembled into usable component parts for use in restricted or limited areas and in short spaces.

Still another object of the invention is to provide an expandable or extensible level having a plurality of spirit glass indicators, including one in the central portion thereof, in which the last mentioned indicator is positioned in the center portion of the tool when the level is in its fully expanded position.

A further object is to provide a level of the aforesaid type which is so designed and constructed that it can readily and accurately be produced using standard equipment and which can be easily assembled and disassembled for use, storage and shipment, and which can be operated indefinitely without any excessive wear occurring which might interfere with the accuracy or operation of the level.

Another object of the invention is to provide an extensible level of relatively simple construction requiring only relatively simple machining operations to produce from readily available standard material and stock.

Additional objects and advantages of the invention will become apparent from the following description and accompanying drawings, wherein.

Figure 1:
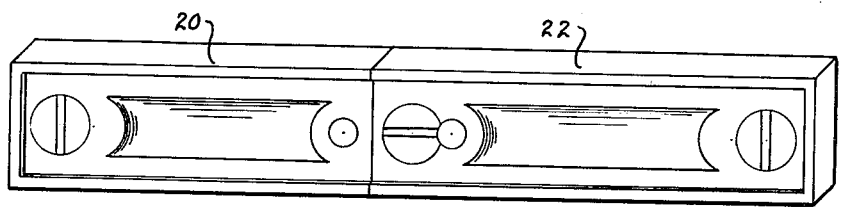
FIGURE 1 is a perspective view of my extensible level showing it in its fully contracted position.
Figure 5:
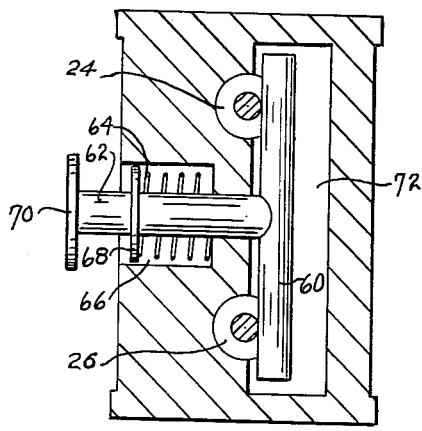
FIGURE 5 is an enlarged vertical cross sectional view of the level, taken on line 5—5 of FIGURE 2, showing the latching mechanism in its locking position.
Figure 6:
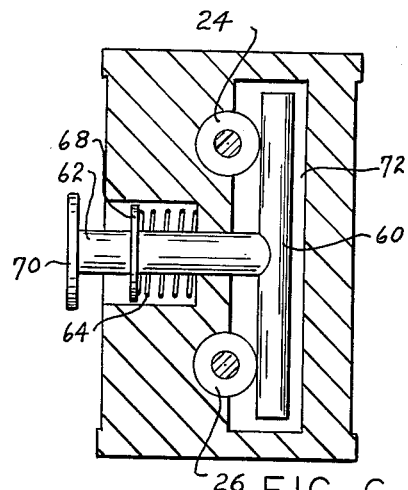
FIGURE 6 is a view similar to that shown in FIGURE 5, showing the latching mechanism in its unlocked position.

Referring more specifically to the drawings and to the embodiment shown in FIGURES 1 through 10, numerals 20 and 22 designate the two body portions, and numerals 24 and 26 the bars connected to and controlled by latch means 28 and 30 mounted in body portions 20 and 22, respectively. Body portion 20 contains a conventional spirit tube 32 spanning opening 34 and being secured at its two ends in the adjacent body structure. Body portion 22 contains spirit level tube 36 disposed in opening 38, and spirit tube 40 disposed in opening 42, tubes 32 and 40 being positioned to determined vertical surfaces, whereas tube 36 is disposed to determine horizontal surfaces. The tubes are constructed of glass or other suitable transparent material and contain any suitable liquid of well known and readily available materials. Since the construction and composition of the spirit tubes form no direct part of the present invention, they will not be described in detail herein.

Body portions 20 and 22 are substantially identical to one another with the exception of the spirit tube 36 and opening 38, each being constructed of metal or wood and containing longitudinal holes 44 and 46 in body 20, and holes 48 and 50 in body 22, for receiving bars 24 and 26 for longitudinal movement therein. The two bars or rods 24 and 26 are identical in size, shape and construction and are preferably made of relatively hard inflexible material, and are machined to fit snugly into holes 44, 46, 48 and 50, the fit, however, being sufficiently loose to permit the body portions 20 and 22 to slide freely on the bars. In order to position the body portions 20 and 22 in various locations along the rods, latch mechanisms 28 and 30 are provided in body portions 20 and 22, respectively, and cooperate with notches 56 and 58 on each end of the two bars. These notches are preferably annular V-shaped grooves and are adapted to receive a member 60 of the latch mechanisms. The details of the latch mechanism are best shown in FIGURES 3, 4, 5 and 6, each mechanism consisting of bar member 60 for seating in grooves 56 and 58 and operating plunger 62, joined to member 60 near the center thereof and projecting outwardly through the side of the body portion of the level, and a spring 64 seating in recess 66 and reacting between the bottom of the recess and a collar 68 rigidly secured to stem 62, the collar likewise seating in recess 66 and being slidable therein to serve as a guide for stem 62. The stem preferably contains a button 70 or the like on the outer end thereof for the operator to use in releasing the latch mechanism. It is seen from FIGURES 5 and 6 that movement of stem 62 to the right as shown in the two figures unseats member 60 from slot 56 or 58, thus freeing bars 24 and 26 so that the body portions can be slid on the two bars freely from one position as indicated by groove 56 to another position indicated by groove 58. After the adjustment is made, the operator release or removes his finger from button 70, and spring 64 automatically reseats member 60 in the groove moved to the position of the latch mechanism. The cavity 72, in which member 60 moves, may be formed to be fully enclosed after the latching mechanism has been assembled, or it may consist merely of a slot or recess extending inwardly from the side opposite stem 62. Since latching mechanism 30 is the same as latching mechanism 28 just described, the details of the former will not be described herein.

Figure 7:
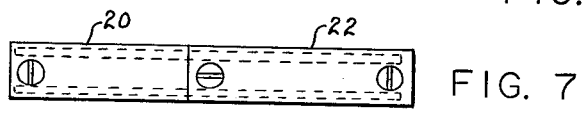
FIGURE 7 is a diagrammatic side elevational view of the present level, showing it in its fully contracted position.
Figure 8:
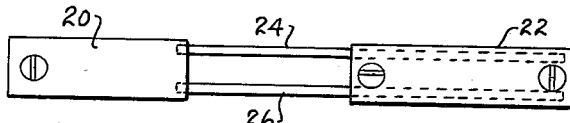
FIGURE 8 is a diagrammatic side elevational view of the level, showing it in a partially extended position.
Figure 9:
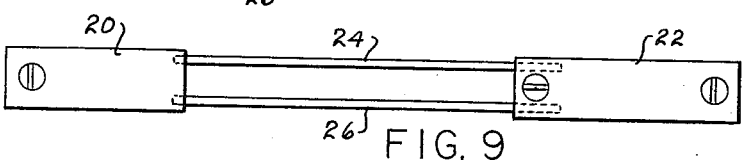
FIGURE 9 is a diagrammatic side elevational view of the level, showing it in its fully extended position.
Figure 10:
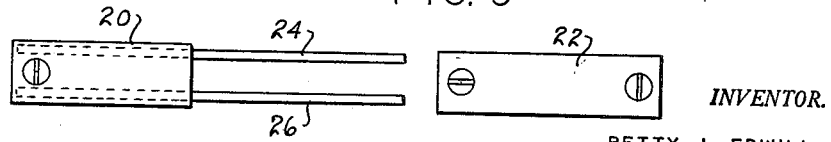
FIGURE 10 is a diagrammatic side elevational view of two parts thereof, showing the manner in which the said parts may be disassembled for independent use.
Figure 2:
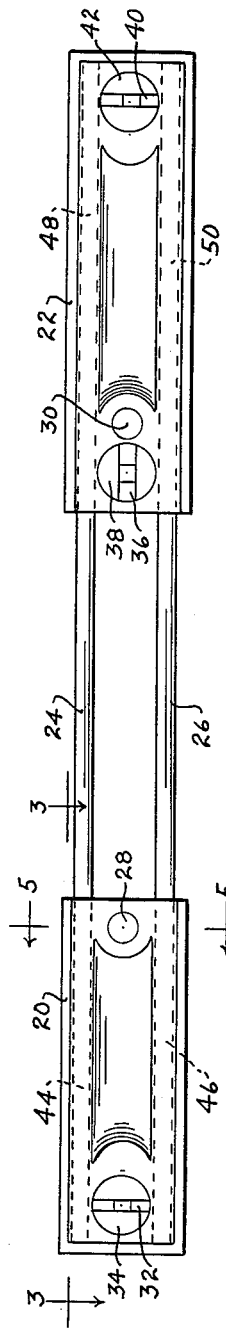
FIGURE 2 is a side elevational view of the extensible level shown in FIGURE 1, showing the level in one of its extended positions.
Figure 3:
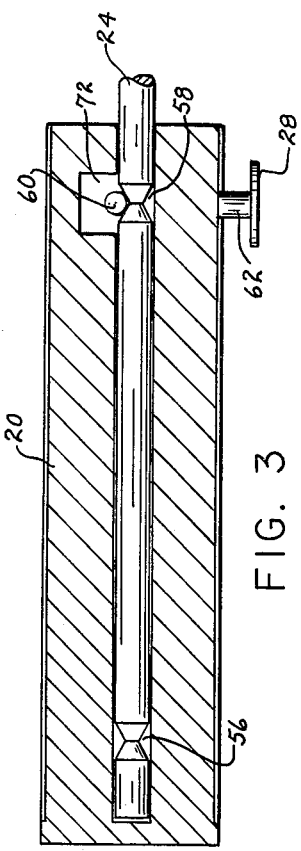
FIGURE 3 is an enlarged vertical cross sectional view through one portion of the level shown in the preceding figures, taken on line 3—3 of FIGURE 2, showing the extensible means thereof in its contracted position.
Figure 4:
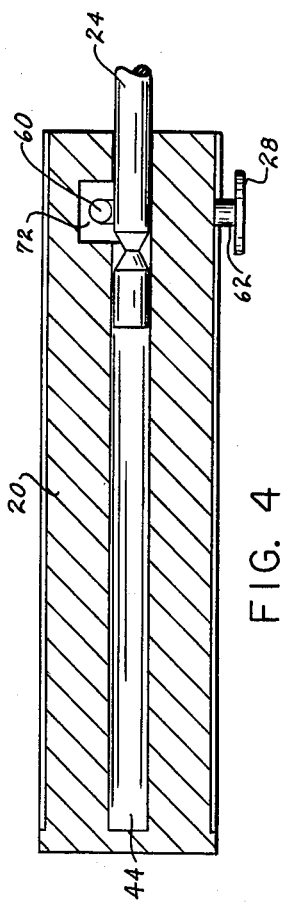
FIGURE 4 is a vertical cross sectional view of the same portion as shown in FIGURE 3 with the extensible means thereof shown in its extended position.

FIGURES 7, 8, 9 and 10 illustrate the various positions available to the operator as a result of the present level construction. FIGURE 7 illustrates the level in its fully closed position. FIGURE 8 shows the level in the position in which latch mechanism 30 has retained the bars of body 22 in their fully contracted position while latch mechanism 28 has been operated to place body portion 20 in its fully expanded position. FIGURE 9 represents the present level in its fully expanded position, i.e. with the latch mechanism seated in the slots at the two ends of the bars. FIGURE 10 illustrates another advantage of the present level in that it can readily be disassembled into its two body portions, and the body portions used as an independent or separate level, thus making available a small unit for restricted areas or limited spaces.

Figure 11:
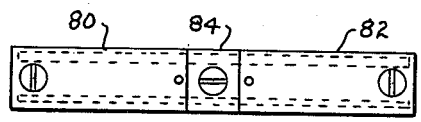
FIGURE 11 is a diagrammatic side elevational view of a modified form of the present level.
Figure 12:
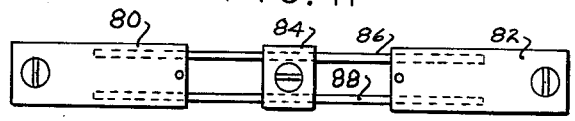
FIGURE 12 is a diagrammatic side elevational view of the modified form shown in FIGURE 11, showing the unit in its partially expanded or intermediate operating position.
Figure 13:
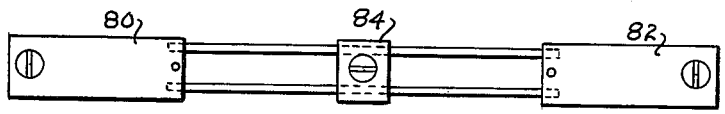
FIGURE 13 is a diagrammatic side elevational view of the modified form shown in FIGURES 11 and 12, showing the level in its fully extended position.
Figure 14:
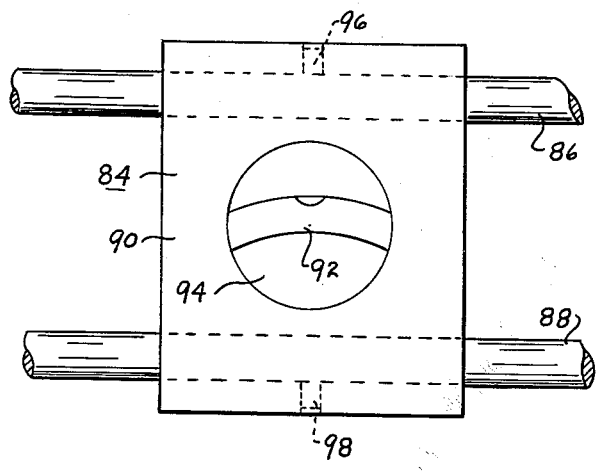
FIGURE 14 is an enlarged view showing details of the modified form of the present level shown in FIGURES 11 through 13.

A modified form of the present level is illustrated in FIGURES 11, 12, 13 and 14, consisting of body portions 80 and 82 and a center section 84. The primary difference between the construction of the level shown in this modified form and the one previously described herein is the placing of the center spirit tube in section 84, which in turn is mounted rigidly to bars or rods 86 and 88. The two body portions 80 and 82, latch mechanism and the bars are otherwise the same as those parts in the previously described embodiment. Center section 84 is shown in greater detail in FIGURE 14, and consists of a block 90 containing spirit tube 92 spanning opening 94, the tube being seated in the wall structure of opening 94 and being placed in position for horizontal use of the level. Block 90 contains two transverse openings for receiving rods 86 and 88, which are secured firmly to block 90 by set screws 96 and 98. With this construction in combination with the rods and latching mechanisms described in connection with the previous embodiments, the level can be used in its contracted position as shown in FIGURE 11, or in its partially extended position as shown in FIGURE 12, or in its fully extended position as shown in FIGURE 13. In this embodiment three grooves are provided on either side of block 90, the closest set of grooves on the two bars representing the closed or fully contracted position of FIGURE 11, the intermediate grooves representing the partially expanded position of FIGURE 12, and the furthest grooves from block 90 representing the position of the level shown in FIGURE 13.

While only two forms of the present level have been described in detail herein, various changes and further modifications may be made without departing from the scope of the invention.

I claim:

1. An extensible level comprising two elongated bodies in end-to-end relation, each of said bodies having a level indicator tube therein, a section between said bodies having an indicator tube therein, each body having a pair of longitudinal round holes extending therein from the ends adjacent the opposite body, a pair of round bars, each bar being disposed in one of the pairs of holes in each of said bodies and secured to said section, each bar having a plurality of annular grooves, and a latch means in each body for the bars including a member for seating in the corresponding grooves of said bars, a stem for unseating said member, and a spring for seating said member in the grooves when the stem is released.

2. An extensible level comprising two elongated bodies in end-to-end relation, one of said bodies having a level indicator, a section between said bodies, each body having a pair of longitudinal holes extending therein, a pair of bars, each bar being disposed in one of the pairs of holes in each of said bodies and secured to said section, and a latch means for the bars in each body.

3. An extensible level comprising two elongated bodies in end-to-end relation, one of said bodies having a level indicator tube for vertical surfaces in the end opposite said other body, and the other body having an indicator tube at each end, the tube nearest the end of said first body being for horizontal surfaces and the other tube being for vertical surfaces, each body having a pair of longitudinally spaced round holes extending therein from the ends adjacent the opposite body, a pair of round bars, each bar being disposed in one of the pairs of holes in each of said bodies, each bar having a plurality of annular grooves in each half representing predetermined expanded positions of the level, and a latch means for the bars in each body including a member for seating in the respective grooves of said bars, a stem for unseating said member from said grooves, and a spring for seating said member in the grooves when the stem is released.

4. An extensible level comprising two elongated bodies in end-to-end relation, one of said bodies having a level indicator in the end opposite said other body and the other body having an indicator at each end, each body having a pair of longitudinal holes extending therein, a pair of bars, each bar being disposed in one of the pairs of holes in each of said bodies, each bar having a plurality of grooves in each half representing predetermined expanded positions of the level, a latch means for the bars in each body including a member for seating in the respective grooves of said bars, a stem for unseating said member from said grooves, and a spring for seating said member in the grooves when the stem is released.

5. An extensible level comprising two elongated bodies in end-to-end relation, one of said bodies having a level indicator in the end opposite said other body, and the other body having an indicator at each end, each body having a pair of longitudinal holes extending therein, a pair of round bars, each bar being disposed in one of the pairs of holes in each of said bodies, each bar having a plurality of grooves in each half representing predetermined expanded positions of the level, and a latch means in each body seating in said grooves for locking said bars in said predetermined positions.

6. An extensible level comprising two elongated bodies in end-to-end relation, one of said bodies having a level indicator in the end opposite said other body, and the other body having an indicator at each end, each body having a pair of longitudinal holes extending therein, a pair of bars, each bar being disposed in one of the pairs of holes in each of said bodies, each of said bars having a groove, and a latch means for the bars in each body, each latch means including a bar member for simultaneously seating in the groove of said bars, a stem for unseating said last mentioned bar member, and a spring for urging said last mentioned bar member to said groove.

7. An extensible level comprising two elongated bodies in end-to-end relation, one of said bodies having a level indicator in the end opposite said other body, and the other body having an indicator at each end, each body having a pair of longitudinal round holes extending therein, a pair of round bars, each bar being disposed in one of the pairs of holes in each of said bodies, each of said bars having a groove, and a latch means for the bars in each body including a member for seating in the groove of said bars.

References Cited in the file of this patent

FOREIGN PATENTS 706,308    Great Britain _____ Mar. 25, 1954